United States Patent [19]
Hildebrandt

[11] 3,781,455
[45] Dec. 25, 1973

[54] LOW-TEMPERATURE CONDUCTOR ARRANGEMENT

[75] Inventor: Ullrich Hildebrandt, Munich, Germany

[73] Assignee: Linde Aktiengesellschaft, Wiesbaden, Germany

[22] Filed: June 20, 1972

[21] Appl. No.: 264,562

[30] Foreign Application Priority Data
June 21, 1971 Germany.................. P 21 30 692.3

[52] U.S. Cl.......... 174/15 C, 174/DIG. 6, 174/16 B
[51] Int. Cl............................................. H01v 11/00
[58] Field of Search.................... 174/15 C, DIG. 6, 174/16 B, 99 B, 28; 335/216; 165/105; 62/498

[56] References Cited
UNITED STATES PATENTS
3,431,347   3/1969   Kafka et al....................... 174/15 C
3,686,422   8/1972   Doose............................. 174/15 C
3,646,243   2/1972   Graneau et al................ 174/DIG. 6
3,522,361   7/1970   Kafka.............................. 174/15 C Primary Examiner—Bernard A. Gilheany
Assistant Examiner—A. T. Grimley
Attorney—Karl F. Ross

[57] ABSTRACT

A low-temperature conductor is enclosed in a conduit traversed by a low-temperature fluid, e.g. a liquefied gas, which in addition to being supplied at any extremity of the cable is introduced in part at intermediate locations along its length with a flow-velocity component toward the conductor without interrupting the outer conduit or exposing the conductor to ambient conditions.

14 Claims, 8 Drawing Figures

LOW-TEMPERATURE CONDUCTOR ARRANGEMENT

FIELD OF THE INVENTION

The present invention relates to low-temperature conductors of electrical energy and, more particularly, to cryogenic and/or superconductive energy-transmission systems such as microwave ducts or conductive cables. More particularly, the invention relates to improvements in systems for conducting electricity at low temperatures and for placing low-temperature fluids in heat-exchanging relationship with a low-temperature conductor.

BACKGROUND OF THE INVENTION

Low-temperature conduction of electricity makes use of the principle that ohmic-resistance and other electrical losses of a conductive system, e.g. a waveguide or a cable, are often less at low temperatures. In such systems, an electrical conductor generally traverses an outer conduit or duct which is insulated from the ambient by high-efficiency thermal insulation, radiation shields, vacuum chambers or combinations thereof, while a low-temperature fluid is disposed in or traverses the conduit in heat-exchanging relationship with the conductor. The low-temperature fuids may be so-called cryogens, such as liquid nitrogen, liquid helium or liquid hydrogen, and may be described as liquefied gases. The conductor may be a material which, at the temperature of the cryogen, manifests superconductive phenomena or simply a conductor whose resistance is lower at the low temperatures of the cryogen.

Among the difficulties encountered with such systems is the need over relatively short lengths of cryogenic conductor, to provide means for introducing the cryogen into the space between the insulated conduit and the conductor or any further duct carrying same. In most prior-art systems, special end caps must be provided at one or both terminals of the particular length of cryogenic conductor for introducing the cryogen, the conductor contacting the ambient environment in these regions. When conductors of greater length are desired, the outer conduit is interrupted along the length of the current-carrying member and may be provided with such caps at these intermediate locations. Since the conductor also contacts the ambient environment and may be at ambient temperature within the gaps between the caps, the current-carrying capacity is limited for a given length of cryogenic conductor system and, for a given current-carrying capacity, the conductor length has limits much below those which are required. The problem is particularly acute when the conductor is to operate at extremely low temperatures, e.g. those of superconductivity, with cryogenic fluids such as helium which are most susceptible to loss. When reference is made herein to a source of the cryogen or cryogenic fluid, it should be noted that it is intended thereby to refer to a source of the virgin cryogen or to a cooling station in which cryogen is recovered from the conduit, is cooled, and is returned to the latter.

In practice, with helium-cooled superconductors, prior-art systems have a length up to several kilometers although cryogenic-conductor lengths totaling several hundred kilometers are desired for modern power-transmission systems. Because of the fact that cooling stations or coolant sources must be provided with respective end closures at relatively closely spaced locations, a large number of such sources must be provided and, with prior-art end caps or closures, a significant number of temperature-rise zones are found. The problem is especially acute where superconductors are involved because the current-carrying capacity thereof may be limited by the temperature to which the conductor is raised at any one point. Hence, at the region between sections of conduit, considerable effort must be made to maintain low temperatures at the conductor with high insulating costs and the like.

OBJECTS OF THE INVENTION

It is, therefore, the principal object of the present invention to provide an improved system for carrying electrical energy over long distances whereby the disadvantages of earlier systems can be obviated.

It is another object of the present invention to provide a cryogenic conductor for the purposes described, wherein interruption of the outer conduit for supply of the cryogen is not necessary.

Still another object of the invention is to provide a low-temperature cable arrangement which may be manufactured and operated at low cost.

SUMMARY OF THE INVENTION

These objects and others which will become apparent hereinafter are attained, in accordance with the present invention, with a current-carrying cryogenic or low-temperature cable, adapted to traverse long distances, wherein the cable is provided with at least one coolant inlet through a substantially continuous and uninterrupted conduit (uninterrupted at least at the coolant inlet) which is so arranged that the coolant is injected into the duct with a velocity component in the axial direction and toward the conductor axis. According to this concept, the interior of the duct is provided, at least at the inlet which is located at some distance from either extremity of the conduit, when fluid-guide means forming one or more channels converging in the direction of flow of coolant within the duct. According to the invention, therefore, a coolant flow is established within the duct, e.g. from one extremity to another, and, at a location intermediate these extremities, an additional quantity of the coolant is injected with a flow or velocity component toward the conduit axis and in the direction of flow of the fluid.

Where it is desired to remove fluid from the conduit, e.g. for recooling, a simple outlet fitting can be provided on the pipe. In general, it is not necessary with this system to expose the conductor to ambient temperature.

An important advantage of the system described above resides in the fact that the passage may be formed in a sheath intermediate the conductor and insulated conduit with a long path which is several or more times the radial dimension of the gap between conductor and conduit wall. Where the intermediate or partition member is also an insulator, this increases the leakage-current or breakdown path in the partition so that, in spite of the fact that it is provided with gaps to admit and withdraw the coolant, electrical breakdown through the gap is precluded. In spite of the gaps, moreover, the partition of high-voltage-breakdown characteristics may be used without substantial increase in its thickness. It has been found to be particularly desirable to choose a coolant with a breakdown potential which is at least equal to the breakdown potential of the partition or sheath.

An important feature of the present invention, therefore, resides in the formation of passages having an angle included with the axis of at most 15° and preferably below 10°. According to another feature of the invention, the shortest path through the passage or along the surfaces of the walls defining the passage has a breakdown potential equal to the breakdown potential of the partition or sheath over the remainder of its length. By way of example, where the highest voltage to be experienced is 20 kilovolts and the breakdown resistance of the sheath material is 10 kilovolts/cm, the ratio of these values yields a thickness of 2 cm which is the required thickness of the sheath. Where the breakdown resistance of the coolant is one kilovolt/cm, the shortest path of the passage must have a length of 20 cm and the passage will then have a length of 20 cm over the thickness of 2 cm so that the sine of the angle included between the passage wall and the axis is one tenth.

According to the invention, the passage is preferably frustoconical or corresponds to a surface of revolution defined by a straight-line generatrix. However, the passage may be formed by individual bores lying along generatrices of a cone having an axis coinciding with that of the conductor and drill in the electrically insulating sheath. Again, by way of example, where the sheath has a thickness of 2 cm and a shortest path of 20 cm, the bore length will be 20 cm corresponding to an angle of about 6° between the passage and the cable axis. It has been found to be advantageous to make the diameter of the bores small by comparison to the thickness of the sheath, i.e. a maximum of about $0.6\ t$ where $t$ is the sheath thickness. The maximum transverse dimension of the passage, when the latter is not a simple bore, should be comparable. A bore diameter of 1 cm or a transverse dimension of a conical passage of 1 cm has been found to be convenient with a sheath thickness of 2 cm.

According to a further feature of the invention, the passage is defined between two coaxial frustoconical surfaces each of which is centered upon the conductor axis. This construction has been found to be particularly simple and inexpensive where the electrically insulating sheath is composed of pipe sections which may be tapered at their ends and assembled with a slight clearance. Preferably, the two conical surfaces have different angles and are inclined at different angles to the cable axis. The cross-section of the channel can then be made approximately equal over its entire length.

According to another feature of the invention, the passage may be a spiral lying along a conical surface of the type described to increase the passage length. An increase in the length of the breakdown path formed by the passage may also be obtained by forming the frustoconical surfaces defining the passage with circular ridges and channels which interfit at least in part so that a staggered flow of fluid is provided along the passage. Different conicity angles or a transverse curvature may similarly be provided.

According to the present invention, the passage or passages at a particular location communicate with an angular channel having a relatively large cross-section designed to avoid pressure drop in the cooling-supply system and formed in the outer conduit around the sheath. The sheath may be thickened in the region of the passage to increase the breakdown potential thereof over even the beveled or tapered portions of the sheath.

Still another feature of the invention resides in providing the passages at the inner and outer surfaces of the sheath with a self-supporting layer provided with openings and composed of electrically conductive material. This material appears to distribute otherwise potentially dangerous voltage gradients and reduces the breakdown potential in the gap.

Where the maximum service voltage of the conductor (e.g. in kilovolts) is $V_{max}$, the breakdown voltage per unit thickness of the sheath is $B_s$ (in kilovolts/cm), and the breakdown voltage per cm of the liquid (cryogen) is $B_L$, the thickness $t$ of the sheath, the angle $\alpha$ defined between the the passage wall and the axis, the maximum transverse dimension of the passage $d$ and the passage length $L$ can be defined by the relations:

$$t \geq V_{max}/B_s \tag{I}$$

$$t/L \leq B_L/B_s \tag{II}$$

$$\sin\alpha \leq B_L/B_s \tag{III}$$

$$L \leq t/(\sin\alpha) \tag{IV}$$

DESCRIPTION OF THE DRAWING

The above and other objects, features and advantages of the present invention will become more readily apparent from the following description, reference being made to the accompanying drawing in which.

SPECIFIC DESCRIPTION

Figure 1:
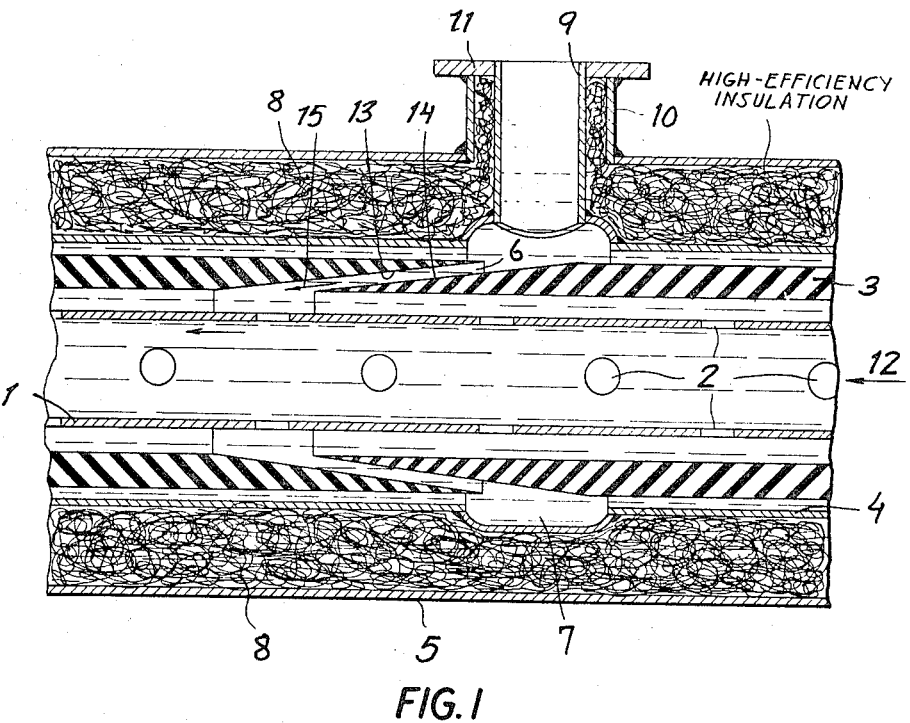
FIG. 1 is an axial cross-sectional view of a cryogen-feed portion of a low-temperature conduit according to the present invention.

In FIG. 1 of the drawing, I show a portion of a cryogenic conduit in which a tube 1 is preferably constituted from aluminum and serves directly as an electrical conductor. Around the tube 1 there is arranged, coaxially therewith, an electrically insulating sheath or partition 3 here shown to be constituted by axially aligned tubes defining a cryogenic passage 6 between them. The sleeve or sheath 3 is spacedly surrounded by an outer conduit 7 - 11 described in greater detail below.

The passage 6 is defined between two coaxial frustoconical surfaces 13 and 14 of the ends of the tubes defining the sheath 3 such that the surfaces 13 and 14 are centered on the axis 12 of the assembly. The passage 6 converges in the axial direction toward the axis 12 so that the cryogen introduced into the system receives a velocity component in the direction of arrow 15, i.e. inwardly toward the conductor 1. This decreases the possibility of an electrical breakdown or leakage-current migration from the conductor 1 outwardly. The annular cross-section of passage 6 is, in comparison to the cross-section of the sheath 3, relatively small while the length of the passage is relatively large. The angle $\alpha$ of the passage is thus defined by the relationship $\sin \alpha = t/L$ where $t$ is the radial thickness of the sheath 3 and $L$ is the length of the passage. The angle $\alpha$ is preferably less than 15° and, more especially, at most 10°. The length $L$ is selected so that the breakdown potential of the liquid across this length and along the surfaces defining the passage is at least equal to the breakdown potential of the wall of sheath 3. To increase the breakdown potential of the thinner portions of the wall in the region of the passage 6, the latter may be more dense.

The electrically insulating sheath 3 is spacedly surrounded by a metallic inner duct 4 which is formed with an annular channel 7 of larger cross-section than the cross-section of the passage 6, the channel 7 communicating with the passage 6 for feeding the low-temperature liquid to the system. The space between the inner duct 4 and an outer duct 5 is evacuated and may be filled with heat-insulating material 8, e.g. a porous filling, a series of fiber layers or as layers of paper coated with metal foil to reduce heat transmission by reflective, convective and conductive means. A radial fitting 9 communicates with the annular channel 7 and is surrounded by a coaxial sleeve 10 forming part of the outer pipe 5. A flange 11 bridges the sleeve 10 and the inner pipe 9 and allows a source of cooling fluid to be connected to the system.

Figure 2:
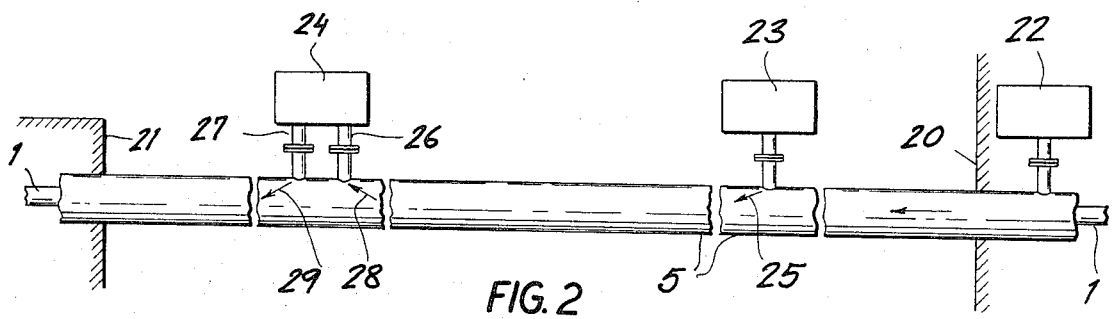
FIG. 2 is a diagrammatic elevational view of a system embodying the present invention.

In FIG. 2, the system is seen to comprise a pair of terminals 20 and 21, which may be spaced by several hundred kilometers and at which the conductor 1 emerges. At least at one of these terminals, a source of low-temperature fluid is provided as represented at 27 (e.g. the outlet of a helium-liquefying apparatus), while at intermediate locations along the conduit additional cryogenic sources 23 and 24 are provided. Source 23 is shown to be the outlet of a helium-liquefying refrigerating unit and feeds liquid helium into the system as represented by the arrow 25 while unit 24 has an inlet 26 and an outlet 27 connected to respective fittings of the conduit to receive fluid in the direction of arrow 28 and to return fluid in the direction of arrow 29 after further cooling. The passage by which the fluid is withdrawn from the system may be a fitting such as that shown at 9 located upstream of the return fitting.

The outer conduit is, of course, evacuated as previously indicated while the sheath 3 may be composed of laminations of synthetic resin and metal foil to serve both as a radiation and heat-conduction barrier. It is, moreover, electrically nonconductive.

Through the supply fitting 9, the liquid-helium coolant is introduced through the evacuated wall of the conduit into the interior of the inner duct 4 and is distributed by the annular channel 7 over the entire mouth of frustoconical passage 6. The cryogen flows through this passage in the sheath 3 in the direction of the conductor 1 and along the conductor in the usual manner. The inner duct 4 can be at ground potential while the conductor 1 is at a potential of, for example, 100 kilovolts.

The conductor 1 is provided with perforations 2 to enable the coolant to flow into contact with both its inner and outer surfaces. Since the entire space surrounded by the inner duct 4 is flooded with the coolant, the insulating sheath 3 is immersed therein.

Figure 3:
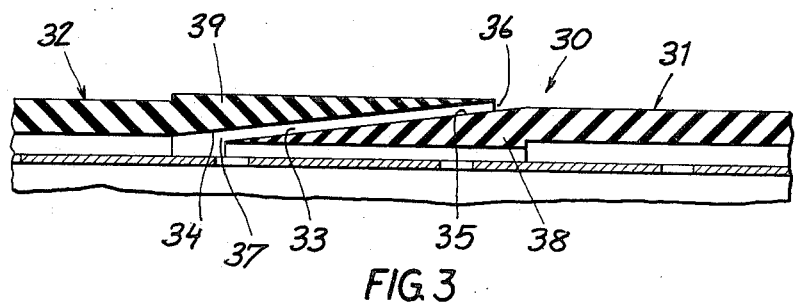
FIG. 3 is a detail view of the passage of the sheath or partition member according to another embodiment of the invention in which the partition member is thickened at the passage.

In FIG. 3, there is shown a modification of the structure of the sheath, here represented at 30 and comprising two axially aligned tubes 31 and 32 which define the passage 33 between them. The outer frustoconical surface 34, however, has a smaller apex angle than the inner frustoconical surface 35 so that the cross-section at the mouth 36 of the passage 33 is equal to the cross-section at the other end 37 thereof. The terminal portions 38 and 39 of the tubes 31 and 32 are thickened to increase the resistance to electrical breakdown.

Figure 4:
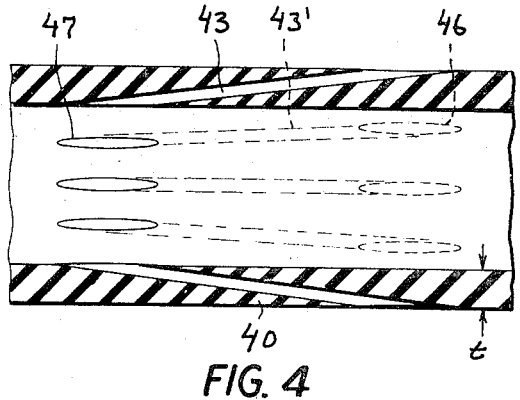
FIG. 4 is an axial cross-sectional view through a partition member for use in the system of FIG. 1 wherein the passages are formed by inclined bore.

In the embodiment illustrated in FIG. 4, the passages 43, 43' etc. are likewise inclined in the direction of the axis of the conductor but are here formed by individual bores of the sheath 40 terminating along the outer circumference thereof in orifices 46 and along the inner circumference in orifices 47. The bores advantageously have a diameter $d <$ the thickness $t$ of the tube 40 and preferably $< 0.6t$. When the tube 40 has a thickness of 2 cm, therefore, the bore has a thickness of 1 cm.

Figure 5:
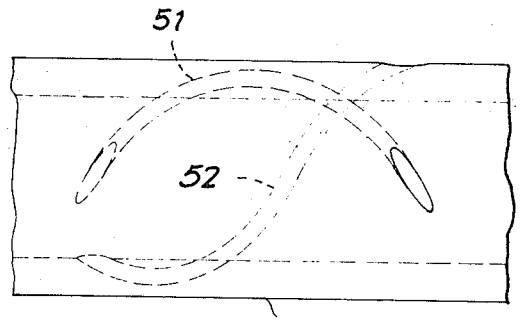
FIG. 5 is an elevational view of a portion of the partition wherein the passages are generally spiral in configuration to increase their length.

In FIG. 5 there is shown another arrangement for increasing the length of the passage for any given thickness of the tube 50. In this embodiment helical bores 51 and 52 are provided in the wall of the tube and open in the direction of the axis of the conductor with an inclination thereto as already noted. The mouths of the bores are formed on the outer periphery of the tube.

Figure 6:
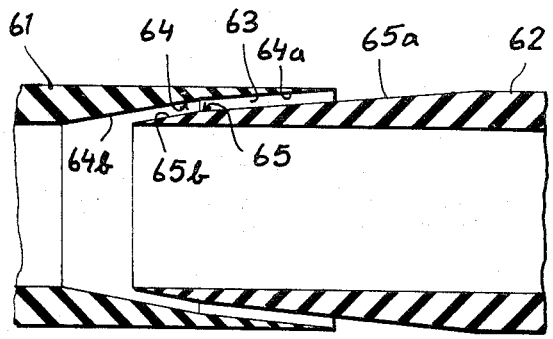
FIG. 6 is a cross-section through the wall of a partition according to another embodiment of the invention.

As shown in FIG. 6, it has been found to be advantageous in some instances to lengthen the passage 63 by defining the latter between the ends of a pair of tubes 61 and 62 between frustoconical surfaces generally represented at 64 and 65. However, these surfaces are each composed of at least two adjoining frustocones 65a, 65b and 64a, 64b which include obtuse angles with one another. While the corresponding surfaces 64a and 65a or 64b and 65b can have the same apex angles, it is desirable to provide different apex angles selected to reduce the width of the passage as its radius (measured from the axis of the conductor) increases, thereby maintaining a substantially constant flow cross-section.

Figure 7:
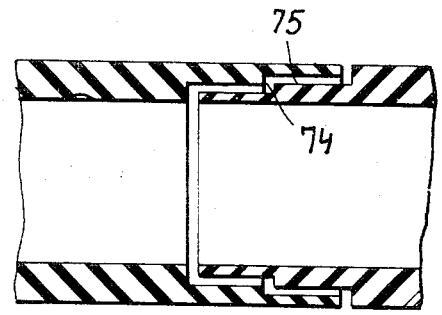
FIG. 7 is a view similar to FIG. 6 wherein the frustoconically inclined juxtaposed surfaces of the partition are stepped.

In the system of FIG. 7, the frustoconical surfaces are provided with annular steps at 74 and 75 to further increase the length of the leakage path.

Figure 8:
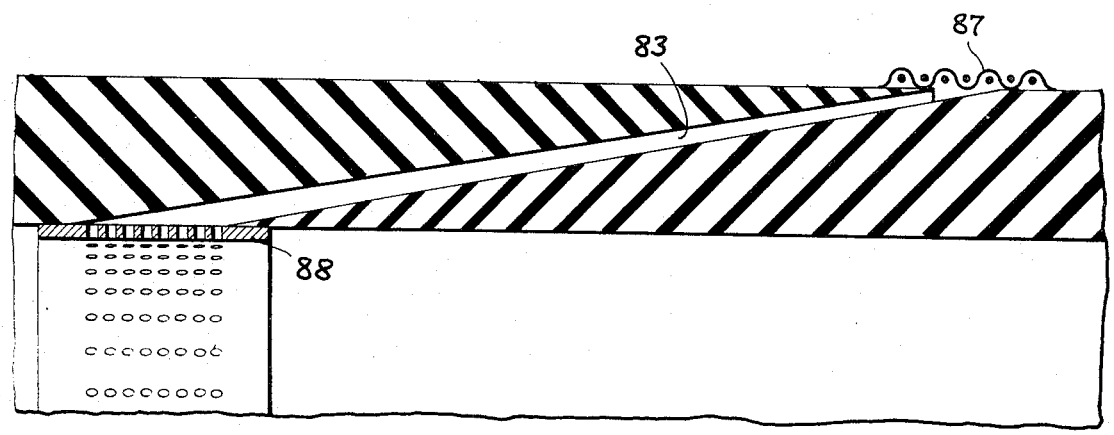
FIG. 8 is a cross-sectional view through the wall of a partition provided with means for reducing voltage concentration in the region of the partition.

FIG. 8 illustrates a system for preventing voltage concentration at the opposite ends of the passage 83, the means used for this purpose being a wire screen 87 or a perforated plate 88 with a flow cross-section designed to prevent constriction of the coolant flow through the passage. The screen 87 and the perforated strip 88 lying along the respective openings are electrically conductive and prevent sharp-edge concentration of high electrical potential.

I claim:

1. a low-temperature electrical-conductor system, comprising:
   an outer duct;
   a conductor received with clearance within said duct and extending along an axis;
   an insulating sheath spacedly surrounding said conductor within said duct; and
   means communicating with the interior of said duct at an intermediate location therealong for introducing a low-temperature fluid into said duct, said sheath being formed in the region of said means with a fluid traversable passage communicating between opposite sides of said sheath toward the axis of said conductor, said passage extending in an off-radial direction.

2. The system defined in claim 1 wherein said duct consists of an inner conduit and an outer conduit defining an evaluated space between them, said inner conduit being formed with an annular channel communicating with said passage and opening toward said sheath, said duct being further provided with insulating means between said conduits and a fitting extending through the space between said conduits and communicating with said channel, said passage including an angle $\alpha$ with said axis of less than 15° and having a substantially uniform cross-section over its length, the length of said passage being at least equal to the product of the ratio of the maximum voltage-carrying rating of the system to the breakdown voltage of said sheath; and a source of said fluid connected to said fitting.

3. a low-temperature electrical-conductor system, comprising:
   an outer duct;
   a conductor received with clearance within said duct and extending along an axis;
   an insulating sheath spacedly surrounding said conductor within said duct; and
   means communicating with the interior of said duct at an intermediate location therealong for introducing a low-temperature fluid into said duct, said sheath being formed in the region of said means with a passage for directing said fluid toward the axis of said conductor, said passage having a length defining a voltage leakage path of a resistance at least equal to the transverse resistance of said sheath.

4. The system defined in claim 2 wherein said passage extends generally along a spiral from the exterior to the interior surfaces of said sheath.

5. The system defined in claim 3 wherein said duct is formed with an annular channel surrounding said communicating with said passage.

6. The system defined in claim 3 wherein said sheath is reinforced in the region of said passage.

7. The system defined in claim 3 wherein said passage opens along the outer surface and along the inner surface of said sheath, said system further comprising a selfsupporting perforated member lying along one of said surfaces in the region of said passage for reducing voltage-concentration regions thereat.

8. a low-temperature electrical-conductor system, comprising:
   an outer duct;
   a conductor received with clearance within said duct and extending along an axis;
   an insulating sheath spacedly surrounding said conductor within said duct; and
   means communicating with the interior of said duct at an intermediate location therealong for introducing a low-temperature fluid into said duct, said sheath being formed in the region of said means with a passage for directing said fluid toward the axis of said conductor, said passage extends along a straight line at an inclination to said axis.

9. The system defined in claim 8 wherein said passage includes an angle $\alpha$ with said axis defined by the relationship $\sin \alpha < t/L$ where $t$ is the thickness of said sheath, $L$ is the length of said passage and the ratio $t$ to $L$ is at most equal to the inverse ratio of the breakdown voltage of said sheath to the breakdown voltage of said fluid.

10. The system defined in claim 9 wherein said passage is defined between a pair of frustoconical surfaces formed on confronting ends of a pair of tubes defining said sheath.

11. The system defined in claim 10 wherein said conical surfaces have different apex angles.

12. The system defined in claim 10 wherein at least one of said frustoconical surfaces is subdivided into two adjoining frustoconical portions having different apex angles and forming an angle between them.

13. The system defined in claim 10 wherein at least one of said frustoconical surfaces is stepped.

14. The system defined in claim 9 wherein said passage is a bore formed in the wall of a substantially continuous tube constituting said sheath.

* * * * *